Oct. 15, 1940.  A. C. LINDGREN ET AL  2,217,872
CORN PICKER
Filed April 8, 1938  4 Sheets-Sheet 1

Inventors
Alexus C. Lindgren
& Clemma R. Raney
By V. F. Lavergne
Atty.

Oct. 15, 1940.  A. C. LINDGREN ET AL  2,217,872
CORN PICKER
Filed April 8, 1938   4 Sheets-Sheet 2

Inventors
Alexus C. Lindgren
Clemma R. Raney
By [signature]
Att'y.

Oct. 15, 1940.  A. C. LINDGREN ET AL  2,217,872
CORN PICKER
Filed April 8, 1938   4 Sheets-Sheet 4

Inventors
Alexus C Lindgren
Clemma R Raney
By V. F. Lasague
Att'y.

Patented Oct. 15, 1940

2,217,872

UNITED STATES PATENT OFFICE 2,217,872

CORN PICKER

Alexus C. Lindgren, Chicago, and Clemma R. Raney, Riverside, Ill., assignors to International Harvester Company, a corporation of New Jersey Application April 8, 1938, Serial No. 200,852

2 Claims. (Cl. 56—18)

This invention relates to a corn picker. More particularly, it relates to a corn picker which is pulled behind a tractor alongside of a wagon.

In constructions where a corn picker is not mounted on a tractor but is pulled behind the tractor as a separate unit, the picker is not directly behind, but is to one side, so that the gathering rolls have access to rows of corn not driven over by the tractor. A wagon for receiving the corn from the picker is normally pulled by the tractor on the other side of the center line of the tractor from the picker. Since the picker is heavier than the wagon, the picker tends to move from its offset position to a position closer to the center line of the tractor. This means that the gathering rolls will not be parallel to the rows of corn, and a satisfactory stripping of the corn from the stalks will not take place.

A primary object of the invention is to reduce the tendency of a pull-behind corn picker to move laterally of its normal line of travel.

A further object of the invention is to provide an improved corn picker which may be pulled in laterally offset position behind a tractor without a tendency to turn out of the line of pull.

Another object of the invention is the provision of a corn picker of unified and compact construction.

A further object of the invention is to provide a pull-behind corn picker in which a husking unit is mounted alongside of a pair of gathering units.

Another object is the provision of a corn picker in which husking and gathering units are mounted side by side and in which an auger feed connects the units.

A further object is to produce a corn picker unit which is balanced about a pivot axis.

Other objects will appear from the disclosure.

According to the invention, a pair of gathering units are mounted side by side on a wheel frame. A husking unit is mounted parallel to the gathering units and an auger feed is mounted at the ends of the husking and gathering units at right angles to them, which serves to transfer the corn from the gathering units to the husking unit. The corn picker, as a unit, is positioned rearwardly and laterally of a tractor with the husker unit nearest to the center line of the tractor. A wagon is positioned alongside of the picker behind the tractor in laterally offset relation. A special form of hitch connects the picker and wagon to one another.

Referring to the drawings—

Figure 1:
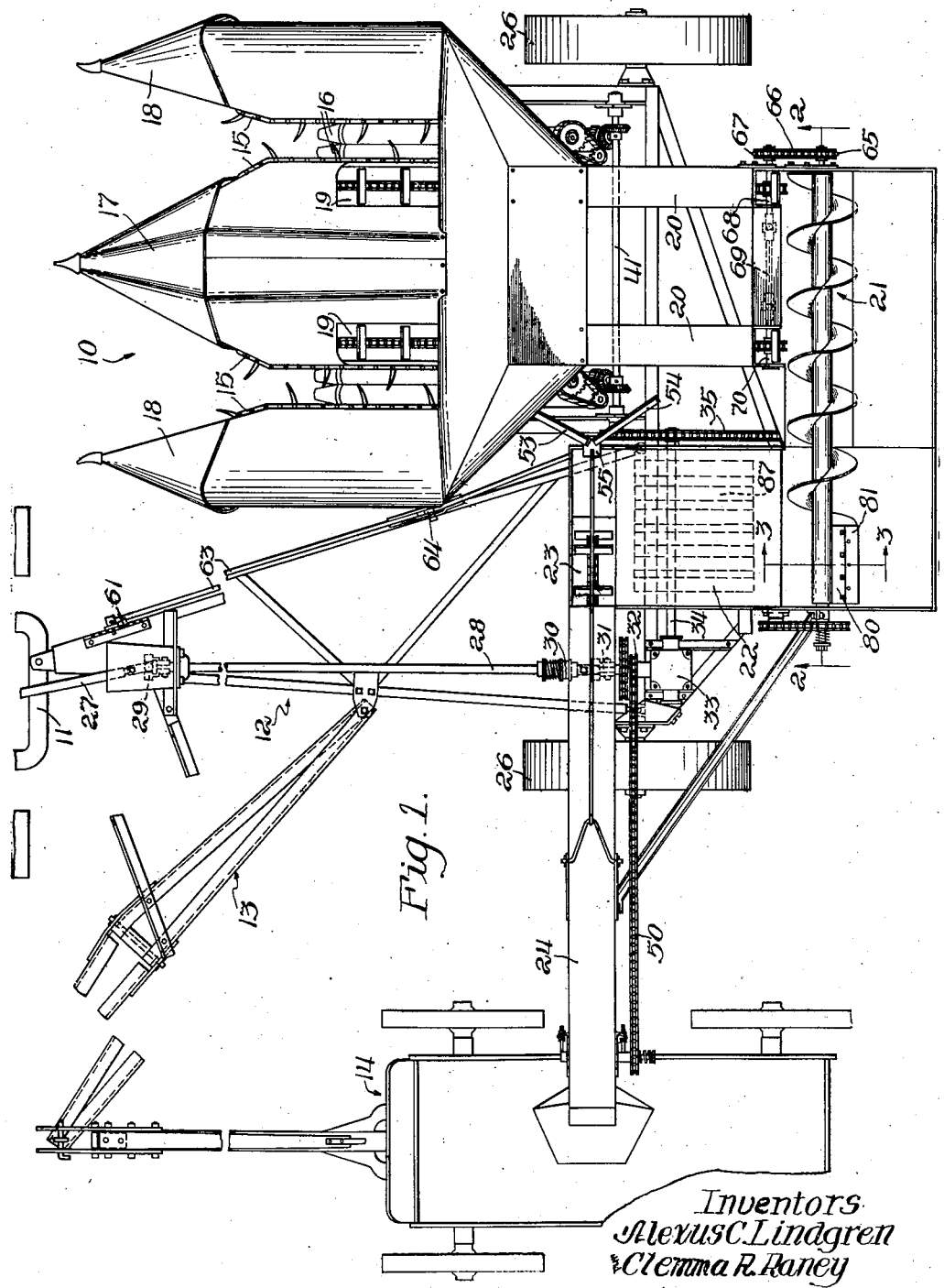
Figure 1 is a plan view of the improved corn picker, showing its connection to a tractor and to a wagon.

A corn picker 10 is shown in Figure 1 to the rear and at one side of a tractor and connected to a U-bar 11 of the tractor by means of a hitch 12. A diagonal beam 13 connects the hitch 12 and a wagon 14 positioned generally alongside of the corn picker and offset from the center line of the tractor on the opposite side from the corn picker.

The corn picker comprises a pair of spaced gathering units, each of which has gathering chains 15 and a pair of snapping rolls 16. There is a central divider point 17 and side divider points 18. At the side of each pair of snapping rolls there is an elevator 19, which runs upwardly and rearwardly through a casing 20 to an auger feed 21. The axis of the auger feed extends substantially transversely of the axes of the snapping rolls and the lines of movement of the elevators. A husking unit 22 extends from one end of the auger feed opposite the elevator casings 20 and generally parallel to them and to the snapping rolls 16.

Figure 4:
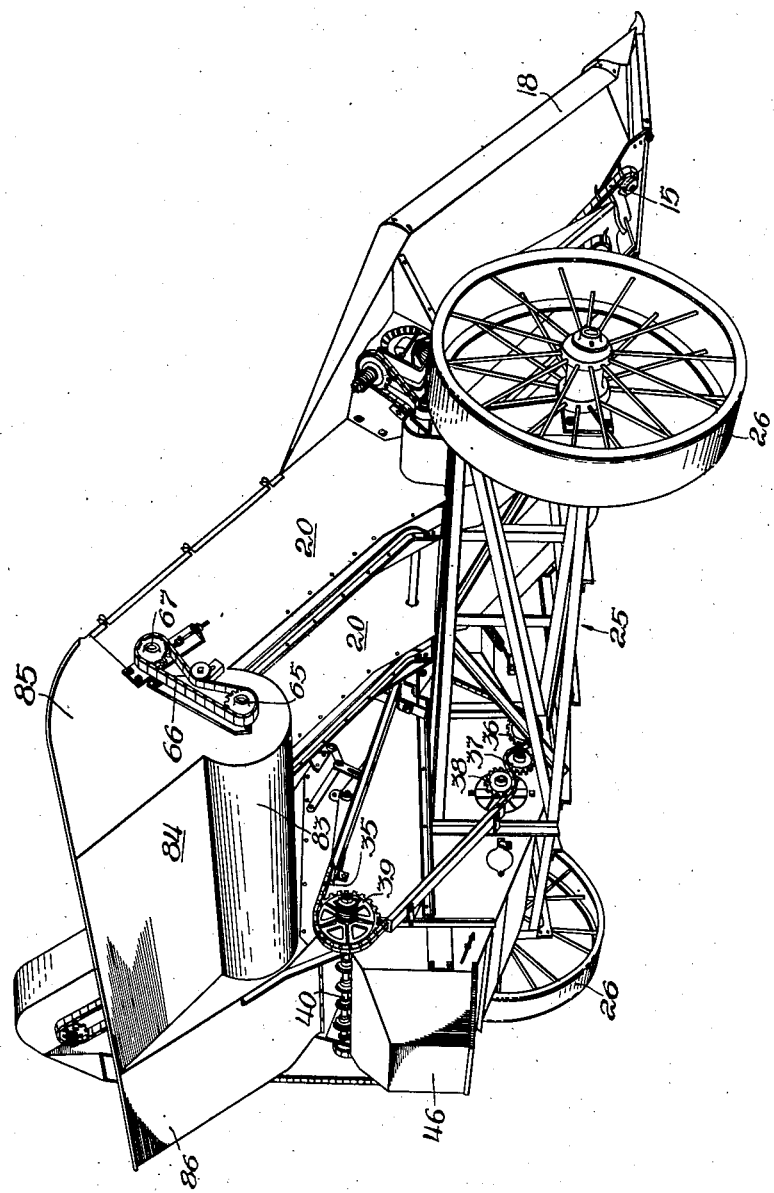
Figure 4 is a perspective view of the corn picker taken from the side and rear away from the wagon.

At the forward end of the husker unit there is a wagon elevator 23 housed in a casing 24 and extending up over the wagon 14. The gathering units, auger feed and husker unit are all supported on a framework 25, as seen in Figure 4, which is, in turn, carried by wheels 26. Power for operating the corn picker is obtained from the power take-off shaft of the tractor through shafts 27 and 28 connected to one another through a universal joint 29. At one end of the shaft 28, there is a clutch 30 and, beyond it, a universal joint 31 and stub shaft 32 extending into a gear-box 33. A shaft 34 extends from one side of the gear-box through the lower part of the husker unit and drives a sprocket chain 35 by means of a sprocket wheel 36. As seen in Figure 4, this sprocket chain extends alongside of the husker unit toward the elevator casings 20 and drives an idler sprocket 37, a sprocket-wheel 38 driving a fan in the lower part of the husker unit, and a sprocket-wheel 39 driving a cross shaft 40 through a slip clutch 39', in turn, driving the husking rolls of the husker unit. As seen in Figure 1, the chain 35 also drives a cross shaft 41, which, in turn, drives the snapping rolls 16 and the gathering chains 15.

The shaft 40, by means of a gear 42 at its end toward the wagon, drives a sprocket chain 43, which drives a sprocket-wheel 44, driving the auger feed 21, and a sprocket-wheel 45, driving a husk conveyer in the lower part of the husking unit, which empties the husks out through a hood 46. Also keyed to the end of the shaft 40, adjacent the sprocket-wheel 42, is a gear wheel 47, which drives a chain 48 driving a wheel 49 connected to the flaps over the husking rolls.

The wagon elevator 23 is driven by means of a sprocket chain 50, sprocket-wheel 51, and stub shaft 52 at the discharge end of the elevator. The sprocket chain 50 is driven from the shaft 32 immediately in front of the gear-box 33.

A gear 65 is mounted on the end of the shaft of the auger feed 21 away from the wagon and drives a sprocket chain 66 driving a sprocket 67. This sprocket is mounted on a short stub shaft 68, which drives one elevator 19. A cross shaft 69 connects the stub shaft 68 through universal joints with a stub shaft 70, by means of which the other elevator 19 is driven.

Figure 5:
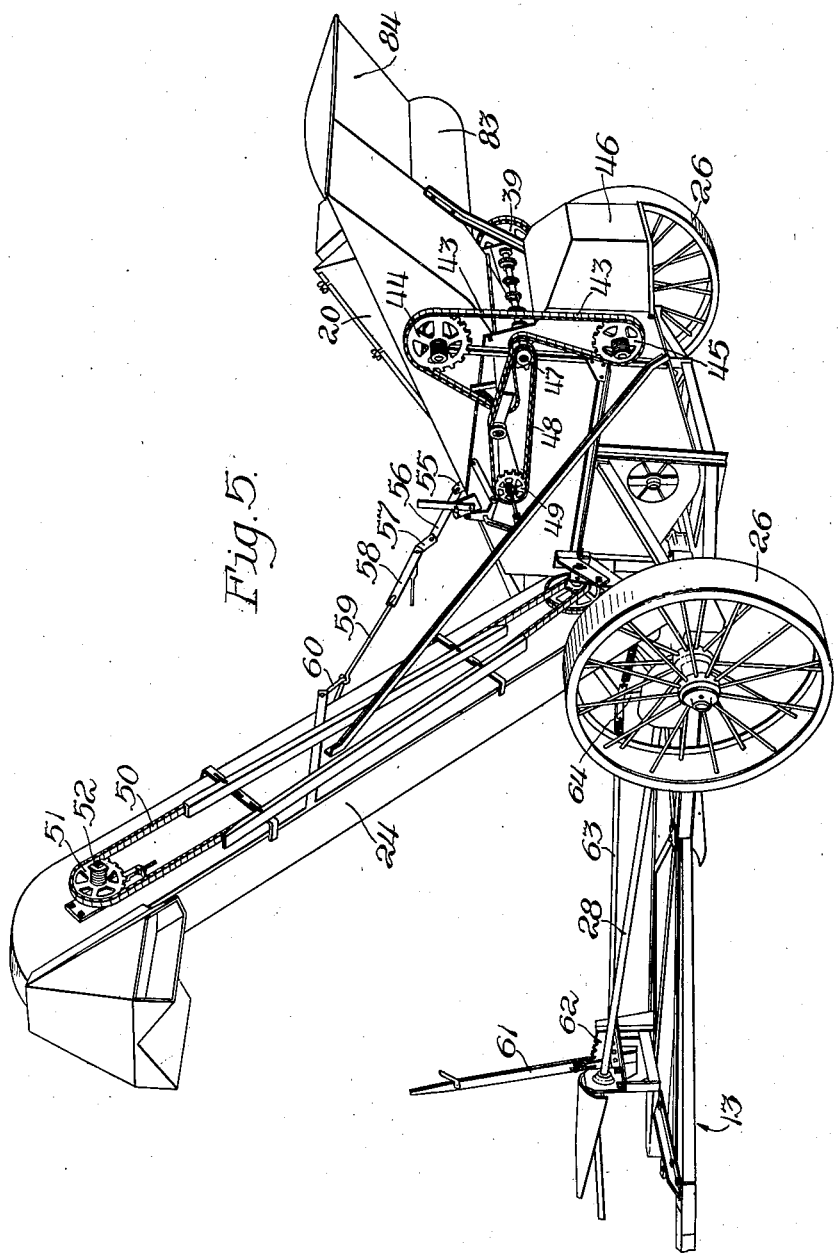
Figure 5 is a perspective view of the corn picker taken from the side and rear toward the wagon.

As seen in Figure 1, brace members 53 and 54 form part of the frame 25 and come to a common point and support a plate 55, at which one end of a link 56 is connected. This link is connected at its other end to a link 57, connected, in turn, to links 58, rods 59 and bail 60 fastened to the wagon elevator casing. By these members the inclination of the wagon elevator is controlled, and it may occupy either the inclined position shown in Figure 5 or a vertical transport position, not shown, in which the links 57 and 58 fold with respect to one another into a locked position with the bail 60 brought nearer to the point 55.

The frame 25 has a pivotal mounting on the wheels 26, which enables the entire picker unit to be swung about the center line of the wheels. It is to be noted that the auger feed 21 is positioned rearwardly of the wheel axis and the frame 25 and balances the gathering units, which extend forwardly of the frame and wheel axis. Thus no counterbalancing spring is necessary. Control is effected by means of a lever 61, which has a detent locking in any of the notches of a curved segment 62. A link 63 extends from the lever 61 and is connected at its other end to a link 64, in turn, connected to the plate 55.

Figure 2:
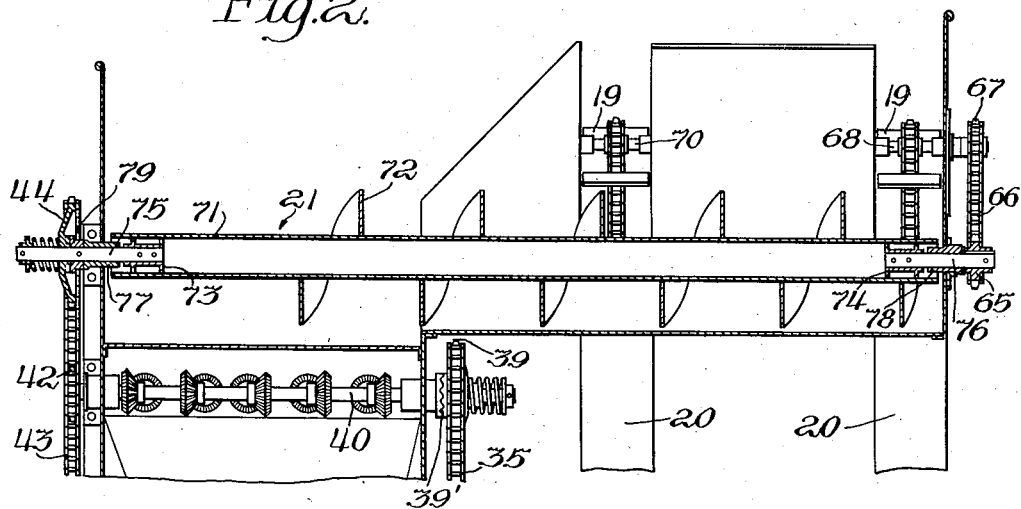
Figure 2 is a section taken along the line 2—2 of Figure 1, showing the details of the auger feed between the gatherer units and the husker units.
Figure 3:
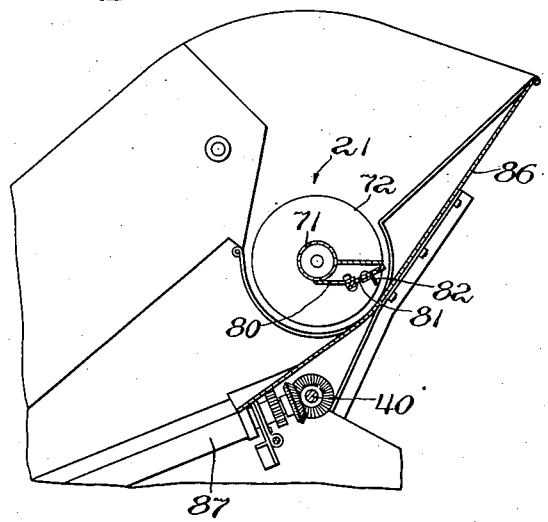
Figure 3 is a section taken along the line 3—3 of Figure 1, also showing the auger feed.

The auger feed 21 is shown in detail in Figures 2 and 3. It comprises essentially a tubular shaft 71 and a spiral fin 72 attached to the outside of the tubular member in any suitable manner. The ends of the tubular member are carried by means of collars 73 and 74 in stub shafts 75 and 76. These stub shafts are journaled in bearing members 77 and 78 connected to the frame of the picker. On the stub shaft 75, which supports the driving sprocket wheel 44, there is a clutch collar 79 engaging the wheel 44 in slip-clutch relation. Thus, if the auger feed should jam, the driving sprocket wheel 44 will become disengaged from the collar 79. At the discharge end of the auger feed, there is a plate member or radial fin 80 attached to the tubular member 71 and extending axially and radially of the tubular member from the end of the helical fin. A rubber member 81 is secured to the plate member 80 at one edge spaced from the tubular member and has an angle member 82 secured to one side. These three parts 80, 81 and 82 serve to direct ears of corn positively into the husking unit.

The sheet metal construction of the picker unit is worthy of special mention. Sheet metal members extend rearwardly from the divider points and centrally to the elevator casings 20. The auger feed 21 is positioned in a trough member 83 connected at the front to the casings 20 and at the rear to a member 84, which is inclined away from the auger feed. A side member 85 is fastened to the members 83 and 84 and forms with them a hopper above and rearwardly of the auger feed. Beyond the trough 83 and member 84 there is another sheet metal member 86, which is inclined rearwardly from above to a point beneath the radial fin 80 of the auger feed. This member 86 extends to the husker unit and forms a chute between the auger feed and the husking unit. Husking rolls 87 extend forwardly and downwardly from the member 86. It is to be noted that the casings 20 and the members 83, 84, 85 and 86 are essentially a unit extending between the gathering units and the husker unit.

In operation, the divider points 17 and 18 are adjusted to the proper position with respect to the ground by means of the lever 61, and, as the tractor pulls the picker over the ground, the gathering chains 15 bring the stalks into the snapping rolls 16. The cobs of corn are snapped from the stalks by these rolls and fall onto the elevators 19 and are conveyed upwardly through the casings 20 into the auger feed 21. The auger feed carries the ears of corn along its length and brings them to the husker unit 22. Any stalks which reach the auger feed will be retained in the hopper formed by the members 83, 84 and 85. As the ears of corn, aided by gravity, pass through the husker unit, the husks are removed and the ears of corn emerge at the forward end of the husking unit and are conveyed, by means of the wagon elevator 23, up into the wagon 14. The husks fall into the lower part of the husking unit and are carried, by means of the husk conveyer, up and out of the hood 46. The details of the husking unit have not been described, since they form no part of the present invention.

As previously stated, the picker is drawn rearwardly and to one side of the tractor, and the wagon is drawn rearwardly toward the other side of the tractor. The picker is much heavier than the wagon and consequently, as the picker is pulled along, it tends to move toward the center line of the tractor. This is true in all pull-behind pickers, which are carried to one side of the center line of the tractor. With the present construction, this tendency of the picker unit to swing toward the center line of the tractor and bring the gathering rolls out of line with the direction of travel of the picker unit is reduced considerably, since the husker unit is placed alongside of the gathering units toward the center line of the tractor. This means that the center of gravity of the picker is brought closer to the center line of the tractor than would be possible in a construction where the husker unit extended rearwardly from the gathering units or transversely of the gathering units at their rearward ends.

The auger feed between the elevators 19 and the husking unit is of special importance in the present construction. It effects the positive feeding of the ears of corn and is of advantage over the ordinary gravity chute, since it may act as a reservoir in case the husking unit stops. Over some other type of positive feed, such as a belt conveyer, the auger feed has the advantage of tending to throw the ears more directly into the husker unit, and also will not clog as easily. Moreover, since the axis of the auger feed is parallel to the cross shaft 40, it may be driven from it, as through sprocket 43, without the use of bevel gears, as would be the case with a belt conveyer in which the driving gears would be transverse to the shaft 40.

The intention is to limit the invention only in terms of the appended claims.

What is claimed is:

1. A corn harvester comprising a frame, a pair of wheels supporting the frame, a first gathering unit mounted on the frame adjacent one wheel and extending at right angles to a line between the wheels, a second gathering unit mounted on the frame substantially midway between the wheels and extending in generally parallel and spaced relation to the first gathering unit, a husker unit mounted on the frame adjacent the other wheel and extending in spaced and generally parallel relation to the gathering units, an auger feed extending at substantially right angles to the gathering units from the husker unit to a point in line with the first gathering unit, elevators extending from the gathering units to the auger feed, and a hitch connected to the frame at a point forward of the husker unit.

2. In a pull-behind picker, a transverse frame mounted on a pair of wheels, a hitch connected to the frame and extending forwardly thereof, a crop-gathering mechanism extending forwardly of the frame to one side of the hitch, a crop-treating mechanism disposed on the frame over the wheel axis behind the hitch in parallel relation to the crop-gathering mechanism, and an auger conveyer located behind said axis for conveying material from the gathering mechanism to the treating mechanism.

ALEXUS C. LINDGREN.
CLEMMA R. RANEY.